United States Patent
Sekine

(10) Patent No.: US 10,795,798 B2
(45) Date of Patent: Oct. 6, 2020

(54) NOTIFICATION CONTROL METHOD AND INFORMATION PROCESSING APPARATUS

(71) Applicant: FUJITSU LIMITED, Kawasaki-shi, Kanagawa (JP)

(72) Inventor: Nao Sekine, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/431,981

(22) Filed: Jun. 5, 2019

(65) Prior Publication Data

US 2019/0377659 A1  Dec. 12, 2019

(30) Foreign Application Priority Data

Jun. 8, 2018 (JP) .................... 2018-110720

(51) Int. Cl.
*G06F 11/36* (2006.01)
*G06F 9/455* (2018.01)
*G06F 9/48* (2006.01)

(52) U.S. Cl.
CPC ...... *G06F 11/3612* (2013.01); *G06F 9/45558* (2013.01); *G06F 9/485* (2013.01); *G06F 2009/45591* (2013.01)

(58) Field of Classification Search
CPC ............ G06F 9/45558; G06F 11/3612; G06F 2009/45591; G06F 9/485; G06F 9/5077
USPC .................................. 717/124–161
See application file for complete search history.

(56) References Cited

U.S. PATENT DOCUMENTS

| 8,327,438 B2* | 12/2012 | Hwang | G06F 21/53 713/187 |
| 8,788,790 B2* | 7/2014 | Brandt | G06F 12/0891 711/209 |
| 8,997,088 B2* | 3/2015 | Gurikar | G06F 8/61 717/168 |
| 10,296,437 B2* | 5/2019 | Ismael | G06F 11/362 |
| 2005/0190692 A1* | 9/2005 | Singh | H04L 67/322 370/229 |
| 2009/0235056 A1* | 9/2009 | Hirai | G06F 9/4812 712/220 |
| 2010/0251363 A1* | 9/2010 | Todorovic | G06F 9/45558 726/22 |

(Continued)

FOREIGN PATENT DOCUMENTS

| JP | 2003-345629 | 12/2003 |
| JP | 2009-223451 | 10/2009 |
| JP | 2016-115296 | 6/2016 |

*Primary Examiner* — Marina Lee
(74) *Attorney, Agent, or Firm* — Fujitsu Patent Center

(57) ABSTRACT

An information processing apparatus includes a memory and a processor coupled to the memory. The processor is configured to acquire identification information of a process executed on a virtual machine and information indicating a behavior of the process at a time when the process is executed, and sequentially store the information in the memory. The processor is configured to refer to the information stored in the memory when a deployment of software in the virtual machine is detected, identify first identification information of a first process such that a change of the behavior at the time when the first process is executed before and after the deployment exceeds a predetermined first criterion. The processor is configured to notify the first identification information to a monitoring process that monitors an operation of the software.

12 Claims, 11 Drawing Sheets

(56) References Cited

U.S. PATENT DOCUMENTS

2018/0287902 A1* 10/2018 Chitalia .............. G06F 11/3006
2019/0377659 A1* 12/2019 Sekine ................... G06F 9/485

* cited by examiner

| USER | PID | %CPU | %MEM | VSZ | RSS | TTY | STAT | START | TIME | COMMAND |
|---|---|---|---|---|---|---|---|---|---|---|
| root | 1 | 0.6 | 0 | 125188 | 3768 | ? | Ss | 6:17 | 0:01 | /usr/lib/systemd/... |
| root | 2 | 0 | 0 | 0 | 0 | ? | S | 6:17 | 0:00 | [kthreadd] |
| root | 3 | 0 | 0 | 0 | 0 | ? | S | 6:17 | 0:00 | [ksoftirqd/0] |
| root | 4 | 0 | 0 | 0 | 0 | ? | S | 6:17 | 0:00 | [kworker/0:0] |
| root | 5 | 0 | 0 | 0 | 0 | ? | S< | 6:17 | 0:00 | [kworker/0:0H] |
| root | 6 | 0 | 0 | 0 | 0 | ? | S | 6:17 | 0:00 | [kworker/u2:0] |
| root | 8 | 0 | 0 | 0 | 0 | ? | S | 6:17 | 0:00 | [rcu_bh] |
| root | 9 | 0.1 | 0 | 0 | 0 | ? | R | 6:17 | 0:00 | [rcu_sched] |
| root | 10 | 0 | 0 | 0 | 0 | ? | S | 6:17 | 0:00 | [watchdog/0] |

FIG. 7A

| USER | PID | %CPU | %MEM | VSZ | RSS | TTY | STAT | START | TIME | COMMAND |
|---|---|---|---|---|---|---|---|---|---|---|
| root | 1 | 0.6 | 0 | 125188 | 3768 | ? | Ss | 6:17 | 10:01 | /usr/lib/systemd/... |
| root | 2 | 0 | 0 | 0 | 0 | ? | S | 6:17 | 10:00 | [kthreadd] |
| root | 3 | 0 | 0 | 0 | 0 | ? | S | 6:17 | 10:00 | [ksoftirqd/0] |
| root | 4 | 0 | 0 | 0 | 0 | ? | S | 6:17 | 10:00 | [kworker/0:0] |
| root | 5 | 0 | 0 | 0 | 0 | ? | S< | 6:17 | 10:00 | [kworker/0:0H] |
| root | 6 | 0 | 0 | 0 | 0 | ? | S | 6:17 | 10:00 | [kworker/u2:0] |
| root | 7 | 0 | 0 | 0 | 0 | ? | S | 6:17 | 10:00 | [migration/0] |
| root | 8 | 0 | 0 | 0 | 0 | ? | S | 6:17 | 10:00 | [rcu_bh] |
| root | 9 | 0.1 | 0 | 0 | 0 | ? | R | 6:17 | 10:00 | [rcu_sched] |
| root | 10 | 0 | 0 | 0 | 0 | ? | S | 6:17 | 10:00 | [watchdog/0] |

FIG. 7B

| USER | PID | %CPU | %MEM | VSZ | RSS | TTY | STAT | START | TIME | COMMAND |
|---|---|---|---|---|---|---|---|---|---|---|
| root | 1 | 0.6 | 0 | 125188 | 3768 | ? | Ss | 6:17 | 10:01 | /usr/lib/systemd/... |
| root | 2 | 0 | 0 | 0 | 0 | ? | S | 6:17 | 10:00 | [kthreadd] |
| root | 3 | 0 | 0 | 0 | 0 | ? | S | 6:17 | 10:00 | [ksoftirqd/0] |
| root | 4 | 0 | 0 | 0 | 0 | ? | S | 6:17 | 10:00 | [kworker/0:0] |
| root | 6 | 0 | 0 | 0 | 0 | ? | S | 6:17 | 10:00 | [kworker/u2:0] |
| root | 8 | 0 | 0 | 0 | 0 | ? | S | 6:17 | 10:00 | [rcu_bh] |
| root | 9 | 0.1 | 0 | 0 | 0 | ? | R | 6:17 | 10:00 | [rcu_sched] |
| root | 10 | 0 | 0 | 0 | 0 | ? | S | 6:17 | 10:00 | [watchdog/0] |

| Proto | Recv-Q | Send-Q | Local Address | Foreign Address | State |
|---|---|---|---|---|---|
| tcp | 0 | 0 | managementvm.:40454 | managementvm.f:http | TIME_WAIT |
| tcp | 0 | 0 | managementvm.fc:ssh | 192.168.246.22:61765 | ESTABLISHED |
| tcp | 0 | 0 | managementvm.:40448 | managementvm.f:http | TIME_WAIT |
| tcp6 | 0 | 0 | localhost:postgres | localhost:49048 | ESTABLISHED |
| tcp6 | 0 | 0 | localhost:49016 | localhost:postgres | ESTABLISHED |
| tcp6 | 0 | 0 | localhost:postgres | localhost:49046 | ESTABLISHED |
| tcp6 | 0 | 0 | localhost:49040 | localhost:postgres | ESTABLISHED |
| tcp6 | 0 | 0 | localhost:49234 | localhost:postgres | TIME_WAIT |
| tcp6 | 0 | 0 | localhost:49230 | localhost:postgres | TIME_WAIT |

FIG. 9B

| Proto | Recv-Q | Send-Q | Local Address | Foreign Address | State |
|---|---|---|---|---|---|
| tcp | 0 | 0 | managementvm.:40454 | managementvm.f:http | TIME_WAIT |
| tcp | 0 | 0 | managementvm.fc:ssh | 192.168.246.22:61765 | ESTABLISHED |
| tcp | 0 | 0 | managementvm.:40448 | managementvm.f:http | TIME_WAIT |
| tcp | 0 | 0 | managementvm.:10050 | zabc.f:10051 | ESTABLISHED |
| tcp6 | 0 | 0 | localhost:postgres | localhost:49048 | ESTABLISHED |
| tcp6 | 0 | 0 | localhost:49016 | localhost:postgres | ESTABLISHED |
| tcp6 | 0 | 0 | localhost:postgres | localhost:49046 | ESTABLISHED |
| tcp6 | 0 | 0 | localhost:49040 | localhost:postgres | ESTABLISHED |
| tcp6 | 0 | 0 | localhost:49234 | localhost:postgres | TIME_WAIT |
| tcp6 | 0 | 0 | localhost:49230 | localhost:postgres | TIME_WAIT |

NOTIFICATION CONTROL METHOD AND INFORMATION PROCESSING APPARATUS

CROSS-REFERENCE TO RELATED APPLICATION

This application is based upon and claims the benefit of priority of the prior Japanese Patent Application No. 2018-110720, filed on Jun. 8, 2018, the entire contents of which are incorporated herein by reference.

FIELD

The embodiments discussed herein are related to a notification control method and an information processing apparatus.

BACKGROUND

A technology of monitoring a behavior of software has been known. For example, software operating on a computer or resources used by software are monitored, and a message is notified when an abnormality occurs.

Related techniques are disclosed in, for example, Japanese Laid-open Patent Publication No. 2003-345629, Japanese Laid-open Patent Publication No. 2009-223451, and Japanese Laid-open Patent Publication No. 2016-115296.

With the progress of a computer virtualization technology, the importance of monitoring software operating on a virtual machine is increasing.

However, there is a situation where a person such as a system administrator or the like is entrusted with a setting of items to be monitored accompanied by the operation of software operating on a virtual machine. When the items to be monitored are set manually as described above, an excess or deficiency may occur. For example, an item which needs to be monitored may not be set as a monitoring target to be missing, or an item which does not need to be monitored may be set as a monitoring target.

SUMMARY

According to an aspect of the present invention, provided is an information processing apparatus including a memory and a processor coupled to the memory. The processor is configured to acquire identification information of a process executed on a virtual machine and information indicating a behavior of the process at the time when the process is executed, and sequentially store the information in the memory. The processor is configured to refer to the information stored in the memory when an introduction of software to the virtual machine is detected, identify identification information of a first process such that a change of the behavior at the time when the first process is executed before and after the introduction exceeds a predetermined first criterion. The processor is configured to notify the identification information to a monitoring process that monitors an operation of the software.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 7A to 7C are views illustrating an example of process lists acquired by a monitoring setting unit according to Embodiment 1;

FIGS. 9A and 9B are views illustrating an example of port lists acquired by the monitoring setting unit according to Embodiment 1;

DESCRIPTION OF EMBODIMENTS

Hereinafter, embodiments of a notification control program, a notification control method, and an information processing apparatus according to the present disclosure will be described in detail with reference to the accompanying drawings. In addition, the present disclosure is not limited by the embodiments. The respective embodiments may be appropriately combined with each other in the scope that does not cause any inconsistency in the process contents.

Embodiment 1

Example of Configuration Applicable to Embodiment 1

Figure 1:
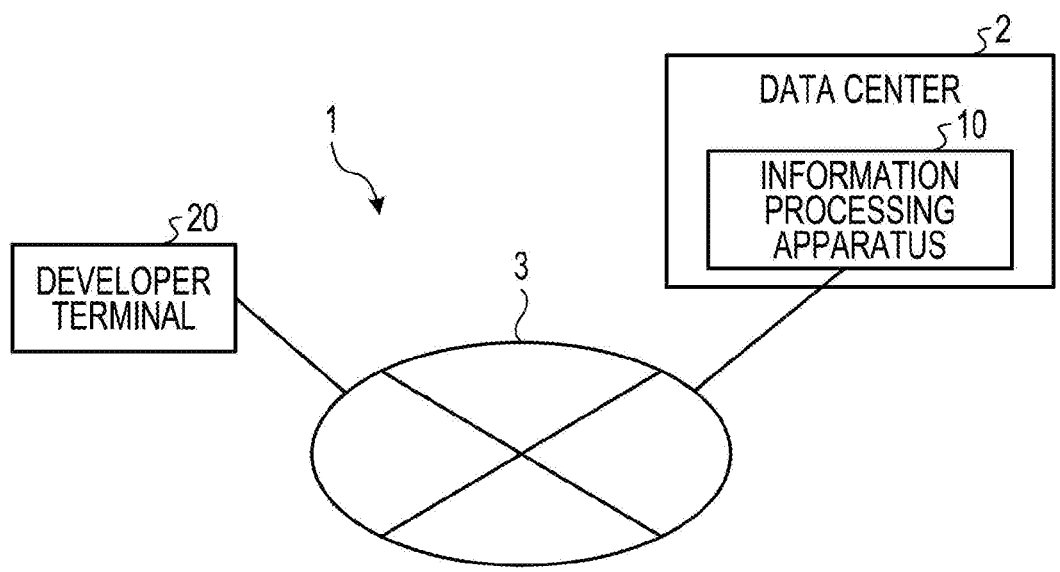
FIG. 1 is a diagram illustrating an example of an information processing system which is applicable to Embodiment 1.

FIG. 1 is a diagram illustrating an example of an information processing system which is applicable to Embodiment 1. In FIG. 1, an information processing system 1 includes an information processing apparatus 10 that is provided in a data center 2, and a developer terminal 20.

The information processing apparatus 10 and the developer terminal 20 are connected to each other to communicate via a network 3. For example, any type of a communication network such as the Internet, a local area network (LAN), a virtual private network (VPN) or the like may be adopted as the network 3, regardless of whether the communication network is a wired or wireless communication network. In addition, although not illustrated herein, other than the developer terminal 20, a terminal of an end user which uses a function provided by a virtual machine such as, for example, a function of a remote desktop or the like may be connected to the information processing apparatus 10.

Hereinafter, descriptions will be made with an example of a use case where a virtual system in which a business system is virtualized is provided as a cloud service. However, the use case is not limited thereto, and a cloud service may be provided in another use case.

The developer terminal 20 is a terminal device used by a developer or the like. Here, in an aspect, the "developer" refers to a person engaged in a development of a virtual system implemented by the virtualization of a computer in an organization such as a company provided with the infrastructure as a service (IaaS), an interested person, or the like.

The information processing apparatus 10 is a computer that provides a cloud service including the IaaS. For example, the information processing apparatus 10 may be constructed to include one or more host or physical machines.

Here, in an aspect, the information processing apparatus 10 may provide (1) a service construction function, (2) an execution function, and (3) a monitoring function.

(1) Service Construction Function

The information processing apparatus 10 may provide a service construction function to construct a service infrastructure for implementing a cloud service, as a front end of the IaaS. Here, the "service infrastructure" indicates a base that serves as an operation environment of software such as an application program to be deployed in a virtual machine, middleware for managing an application program, and etc., and is, for example, a network, a firewall, a virtual machine or the like.

When the service construction function is installed in the front end as described above, the information processing apparatus 10 may be installed with an interface that receives various requests from the developer terminal 20 to convert a Web request from the developer terminal 20 into an application program interface (API).

(1.1) Construction of Service Infrastructure

For example, at the initial stage where the service infrastructure is constructed, the information processing apparatus 10 provides the developer terminal 2 with a service design pattern in which a configuration of a virtual system for implementing a function corresponding to a cloud service is standardized, according to an environment where the cloud service is to be used such as, for example, a type such as a single tenant, a multi-tenant or the like. Under the circumstance where the service design pattern is provided, the developer terminal 20 may select the service design pattern provided from the information processing apparatus 10 through a graphical user interface (GUI) environment such as a dashboard or the like provided by the information processing apparatus 10.

Then, the information processing apparatus 10 constructs a service infrastructure by allocating resources from a resource pool where the IaaS resources such as a central processing unit (CPU), a memory, a disk, a network, and etc., are pooled, to a virtual system corresponding to the service design pattern selected by the developer terminal 20.

When compared to an on-premise installation, the stage in which the service infrastructure is constructed as described above corresponds to a stage in which a network or security of a business system and machines such as a mainframe and others have been fully prepared for an operation of a business application.

(1.2) Deployment of Software

After the service infrastructure is constructed, the information processing apparatus 10 may set an application program to be introduced to the corresponding service infrastructure. As an example of the "introduction," the term "deployment" may be used hereinbelow.

Here, when an application program is deployed in a virtual machine, the information processing apparatus 10 deploys middleware in the service infrastructure, as a base where the application program is operated on the virtual machine operates. In an aspect, the middleware may monitor the operation of the virtual machine or monitor the death of the application program operating on the virtual machine. For example, when a stop of the application program is detected, the middleware may output an alert to the developer terminal 20 or restart the corresponding application program. Furthermore, the middleware may collect the logs output by the application program.

When a request for deploying software such as the application program, the middleware or the like is received from the developer terminal 20, the information processing apparatus 10 deploys the corresponding software in the service infrastructure. When compared to the on-premise installation, the stage in which the application program is deployed in the virtual machine as described above corresponds to a stage in which the business application is installed in a machine such as a mainframe or the like.

(2) Execution Function

Further, the information processing apparatus 10 has an execution function to cause the software described above to be executed on the service infrastructure. In an aspect, the execution function starts the middleware according to an instruction to deploy the software from the service construction function, and further, starts the application program on the middleware.

(3) Monitoring Function

Further, the information processing apparatus 10 has a monitoring function to monitor the service infrastructure or the software deployed in the service infrastructure. For example, in the monitoring function, items to be monitored such as, for example, processes, ports, and etc., may be set through the interface with the developer terminal 20 that has been installed along with the installation of the service construction function.

Aspect of Problem to be Solved

Here, it is difficult to unify and set the items to be monitored during different cloud services, at the stage before the software is deployed in the service infrastructure. In view of this point, there is a difficulty in creation.

For example, when an operation system operates on a virtual machine, the types of the operation system are limited to about several types. Thus, it is realistic to perform tests of all operation systems at the stage before the virtual machine is deployed, so as to narrow down the processes or ports to be monitored.

Meanwhile, when the cloud service is, for example, a business system, there exist various kinds of business applications. Further, in consideration of the compatibility, that is, the combination with the middleware which is deployed as the base of the business application, it is practically difficult to narrow down the processes or ports to be monitored at the stage before the middleware or the application program is deployed in the service infrastructure.

For the reasons described above, there has been the situation where the developer of the business system or the business application is entrusted with manually setting the processes or ports to be monitored. When the developer manually sets the items to be monitored as described above, an access or deficiency may occur. For example, an item which needs to be monitored may not be set as a monitoring target to be missing, or an item which does not need to be monitored may be set as a monitoring target.

Aspect of Solution to Problem

Accordingly, as part of the monitoring function described above, the information processing apparatus 10 according to the present embodiment performs a notification control process of identifying a change of a behavior of a process before and after software such as an application, middleware or the like is introduced to a virtual machine, and notifying a process of which a change of a behavior is identified or the used port as a monitoring target. As a result, in the information processing apparatus 10 according to the present embodiment, the processes or ports to be monitored may be narrowed down and notified on demand. Thus, according to the information processing apparatus 10 of the present embodiment, the items to be monitored may be appropriately set.

Figure 2:
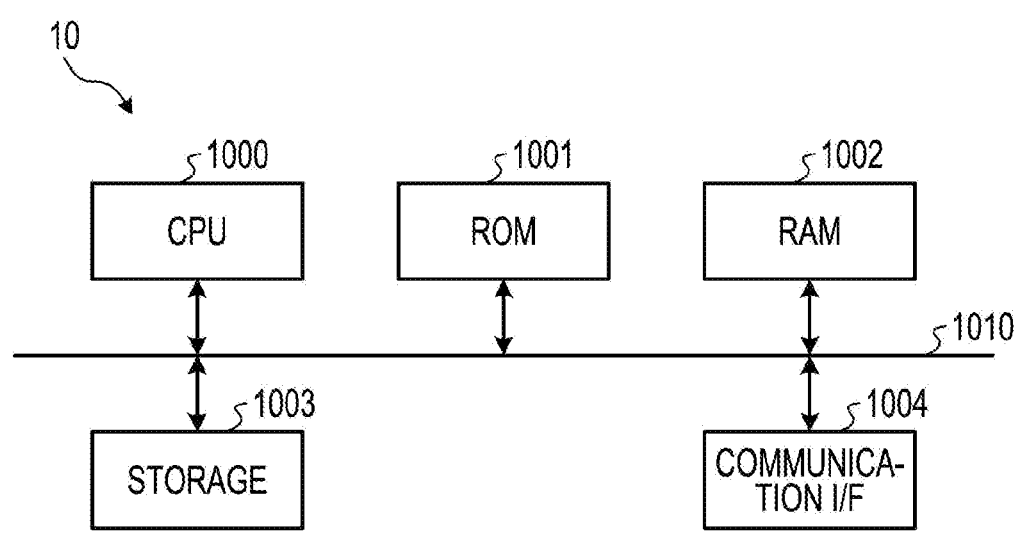
FIG. 2 is a view illustrating an example of a hardware configuration of an information processing apparatus which is applicable to Embodiment 1.

FIG. 2 is a view illustrating an example of a hardware configuration of the information processing apparatus 10 which is applicable to Embodiment 1. FIG. 2 illustrates an excerpted hardware configuration of the information processing apparatus 10 in which a notification control program for implementing the monitoring function among the three functions described above is executed. In FIG. 2, the information processing apparatus 10 includes a CPU 1000, a read only memory (ROM) 1001, a random access memory (RAM) 1002, a storage 1003, and a communication interface (I/F) 1004 which are connected to each other via a bus 1010.

The storage 1003 is a nonvolatile storage medium such as a hard disk drive or a flash memory, and stores various data or various programs for operating the CPU 1000. The CPU 1000 operates using the RAM 1002 as a work memory according to the programs stored in the storage 1003 or the ROM 1001, so as to control the overall operation of the information processing apparatus 10.

The communication I/F 1004 performs a communication via the network 3. Further, when the information processing apparatus 10 includes multiple physical machines, the communication I/F 1004 also performs a communication between the physical machines included in the information processing apparatus 10.

While the example of FIG. 2 illustrates the information processing apparatus 10 that includes a single storage 1003, the present disclosure is not limited to the example. For example, when the information processing apparatus 10 includes multiple physical machines, the information processing apparatus 10 may include an external storage device that may be shared by the respective physical machines, in addition to storages 1003 of the respective physical machines.

When the information processing apparatus 10 includes multiple physical machines, the information processing apparatus 10 may distribute and execute processes in the multiple physical machines. Further, as described above, the information processing apparatus 10 may construct one or more virtual machines. A virtual machine is constructed by using each resource obtained by dividing the resources of the information processing apparatus 10. In Embodiment 1, any of host type and hypervisor type virtual machines is applicable. However, hereinafter, description will be made assuming that the virtual machine is a hypervisor type virtual machine.

Figure 3:
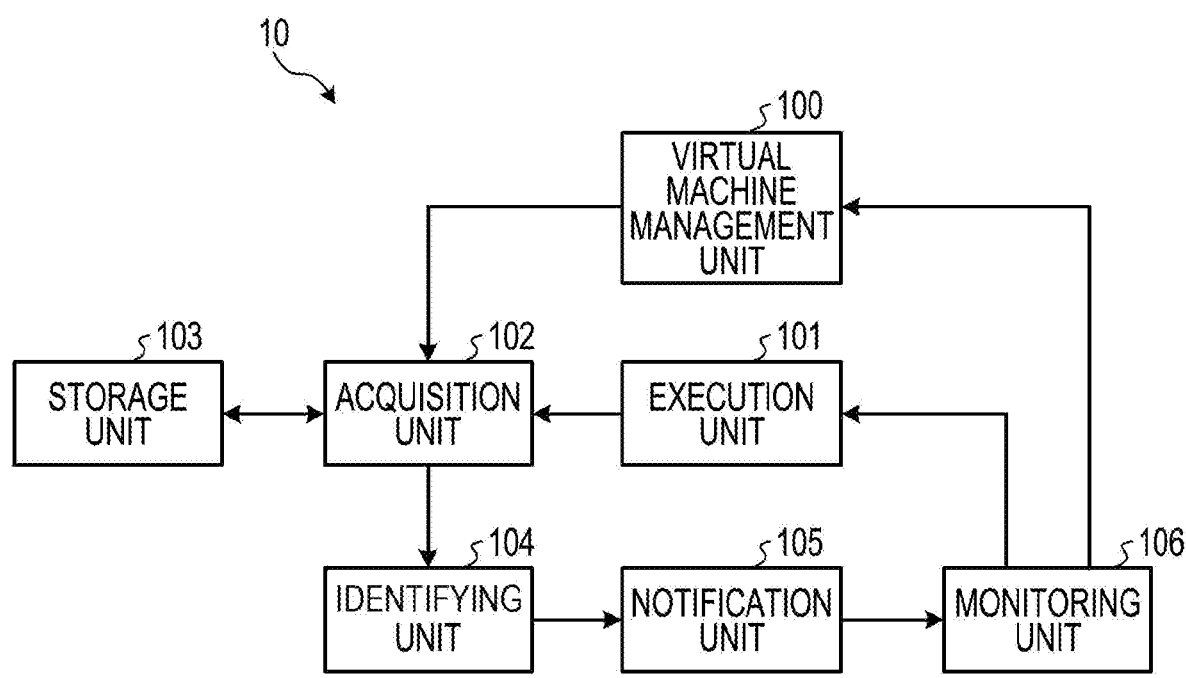
FIG. 3 is an example of a functional block diagram for explaining a function of the information processing apparatus according to Embodiment 1.

FIG. 3 is an example of a functional block diagram for explaining the function of the information processing apparatus 10 according to Embodiment 1. In FIG. 3, the information processing apparatus 10 includes a virtual machine management unit 100, an execution unit 101, an acquisition unit 102, a storage unit 103, an identifying unit 104, a notification unit 105, and a monitoring unit 106.

The virtual machine management unit 100, the execution unit 101, the acquisition unit 102, the storage unit 103, the identifying unit 104, the notification unit 105, and the monitoring unit 106 are implemented by the notification control program operating on the CPU 1000. Without being limited thereto, the present disclosure may be configured by a hardware circuit in which some or all of the virtual machine management unit 100, the execution unit 101, the acquisition unit 102, the storage unit 103, the identifying unit 104, the notification unit 105, and the monitoring unit 106 operate in cooperation with each other.

The virtual machine management unit 100 manages a virtual machine constructed in the information processing apparatus 10. In the present example where the virtual machine is a hypervisor type virtual machine, the virtual machine management unit 100 corresponds to a hypervisor.

The execution unit 101 includes the function of the middleware and provides a function for executing an application program introduced to (installed in) the information processing apparatus 10.

An application program is introduced to the information processing apparatus 10 by, for example, the developer terminal 20. The information processing apparatus 10 may additionally introduce an application program. Further, the information processing apparatus 10 may delete the introduced application program or stop the function of the introduced application program. For example, the information processing apparatus 10 executes the addition or deletion of the application program or stop the function of the application program according to an instruction from the developer terminal 20.

The acquisition unit 102 acquires information on the operation of a virtual machine from the virtual machine management unit 100. Further, the acquisition unit 102 acquires information on the operation of software including the application program and the middleware from the execution unit 101.

The storage unit 103 is a storage medium for storing data and etc., and for example, a predetermined storage area in the RAM 1002 or the storage 1003 may be applied. In addition, the storage unit 103 includes a storage controller that stores data in the corresponding storage medium and reads data from the corresponding storage medium. The storage unit 103 stores the information on the operation of a virtual machine and the information on the operation of software that have been acquired by the acquisition unit 102. The acquisition unit 102 further acquires the information on the operation of a virtual machine and the information on the operation of software that are stored in the storage unit 103.

Based on the information acquired by the acquiring unit 102, the identifying unit 104 identifies a process of which a behavior has been changed accompanied by the introduction of software. Further, based on the information acquired by the acquisition unit 102, the identifying unit 104 identifies a process that uses a port of which a behavior has been changed accompanied by the introduction of software. Further, based on the information acquired by the acquisition unit 102, and based on a use status of hardware of which a behavior has been changed accompanied by the introduction of software such as, for example, a processor (e.g., the CPU 1000) or a memory (e.g., the RAM 1002), the identifying unit 104 identifies a corresponding process.

The notification unit 105 notifies the monitoring unit 106 of identification information for identifying the process identified by the identifying unit 104. The monitoring unit 106 includes a monitoring process of monitoring the operation of the execution unit 101 and the operation of the virtual machine managed by the virtual machine management unit 100. The monitoring process executes the monitoring while staying in the system of the information processing apparatus 10. The items to be monitored by the monitoring unit 106 are set based on the identification information notified by the notification unit 105.

The notification control program for implementing the respective functions according to Embodiment 1 in the information processing apparatus 10 is recorded and provided as a file in an installable or executable format in a computer readable recording medium such as a compact disk (CD), a flexible disk (FD), a digital versatile disk (DVD) or the like. Without being limited thereto, the notification control program may be provided by being stored on a computer connected to a network such as the Internet or the like, and being downloaded via the network. In addition, the notification control program may be provided or distributed via the network such as the Internet or the like.

The notification control program has a module configuration including the virtual machine management unit 100, the execution unit 101, the acquisition unit 102, the storage unit 103, the identifying unit 104, the notification unit 105, and the monitoring unit 106. As actual hardware, the CPU 1000 reads the notification control program from the storage medium such as the storage 1003 or the like, and executes the notification control program, so that the above-described respective units are loaded on a main storage device such as the RAM 1002 or the like, and the virtual machine management unit 100, the execution unit 101, the acquisition unit 102, the storage unit 103, the identifying unit 104, the notification unit 105, and the monitoring unit 106 are generated on the main storage device.

Aspect of Problem to be Solved

For example, when a virtual machine is generated, multiple processes such as, for example, acquiring a system log are generated. The monitoring unit 106 monitors, for example, the operation of software introduced to the virtual machine. In order to monitor, for example, the operation of software, it is not necessary to monitor all of the processes generated on the virtual machine. At this time, when processes to be monitored by the monitoring unit 106 are set by a person, a missing of monitoring may occur because a process which needs to be monitored may not be set, or an increase of a system load may occur because an item which does not need to be monitored may be set. In addition, when the setting is performed by a person, setting costs increase as the number of pieces of installed software increases. Meanwhile, a method may be conceived which constructs a test environment for checking the operation when the software is introduced to the virtual machine. However, in this method as well, costs are incurred for the construction of the test environment.

Aspect of Solution to Problem

In Embodiment 1, in order to monitor, for example, the operation of software, the identifying unit 104 identifies which of the processes is to be monitored, and notifies the monitoring unit 106 of the identified process. To this end, in Embodiment 1, a change which occurs in the operation information of the multiple processes before and after the introduction of software to the virtual machine is identified, and based on the change, a process to be monitored is identified. The information on the identified process is notified as a monitoring target process to the monitoring unit 106.

That is, when the operation status of a specific process among the multiple processes is changed from "does not operate" to "is operating" by the introduction of software in the virtual machine, the process has started to operate by the execution of the software. Thus, the process is notified as a monitoring target process to the monitoring unit 106. In Embodiment 1, since a process to be monitored by the monitoring unit 106 is identified based on a change in the operation information of the multiple processes, the accuracy for identifying a process to be monitored by the monitoring unit 106 may be improved.

Operation According to Embodiment 1

Figure 4:
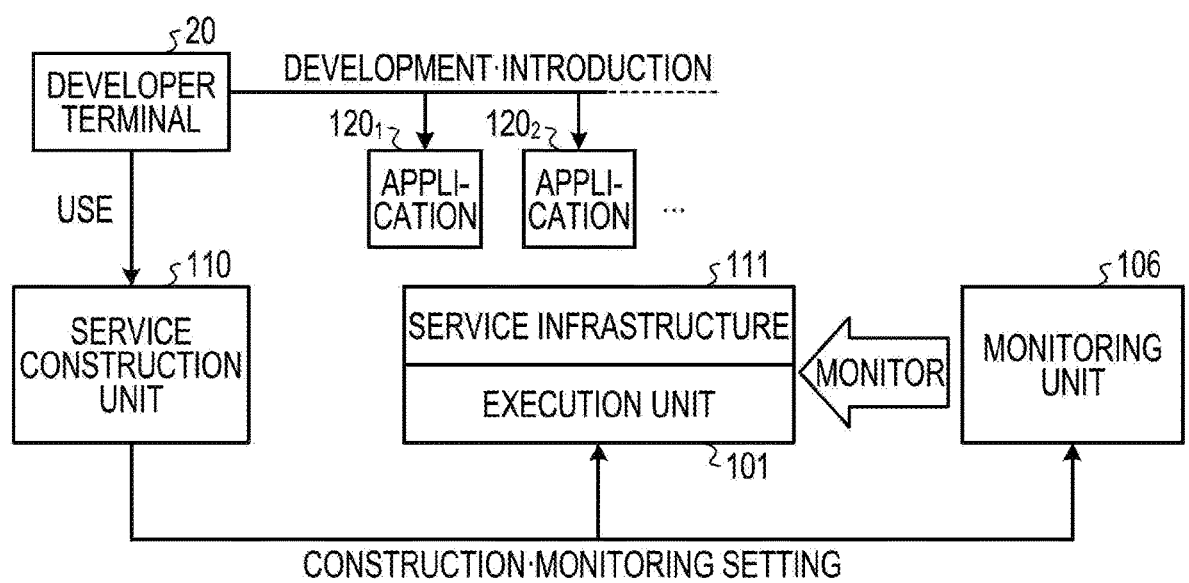
FIG. 4 is a view for explaining a process according to Embodiment 1.

FIG. 4 is a view for explaining the process according to Embodiment 1. In FIG. 4, the portions which are identical to those in FIGS. 1 and 3 will be denoted with the same reference numerals as used in FIGS. 1 and 3, and detailed description thereof will be omitted.

In FIG. 4, the service construction unit 110 is one of the functions included in the information processing apparatus 10, and constructs a service infrastructure 111 for executing an application program for providing a service according to, for example, a use request from the developer terminal 20. In addition, the service construction unit 110 also includes the function of the virtual machine management unit 100, and may construct a virtual machine. Without being limited thereto, the service construction unit 110 may be distributed and disposed as a separate device from the information processing device 10.

The service infrastructure 111 is constructed using, for example, the resources such as the CPU 1000, the RAM 1002, the storage 1003, and etc., included in the information processing apparatus 10, and a resource such as a cloud network, the network 3 or the like. The service construction unit 110 functions as the front end of the information processing system 1 configured by the information processing apparatus 10 according to Embodiment 1.

Further, application programs $120_1$, $120_2$, . . . are introduced to the information processing apparatus 10 by, for example, the developer terminal 20. The application programs $120_1$, $120_2$, . . . may be developed on the information processing apparatus 10 by the developer terminal 20 and introduced to the information processing apparatus 10. The application programs $120_1$, $120_2$, . . . introduced to the information processing apparatus 10 are executed on the service infrastructure 111 by using the function provided by the execution unit 101

In addition, FIG. 4 and FIGS. 10 and 11 to be described later illustrate the application programs $120_1$, $120_2$, . . . as applications $120_1$, $120_2$, . . . , respectively.

Further, the service construction unit 110 starts the monitoring setting unit 200 (see FIG. 5) that performs a setting for causing the monitoring unit 106 to monitor the execution unit 101 or the respective application programs $120_1$, $120_2$, . . . . The monitoring unit 106 monitors the execution unit 101 or the respective application programs $120_1$, $120_2$, . . . according to the set contents. For example, the monitoring unit 106 monitors the life and death of the execution unit 101 or the respective application programs $120_1$, $120_2$, . . . or the presence/absence of a failure of the execution unit 101 or the respective application programs $120_1$, $120_2$, . . . .

Details of Operation According to Embodiment 1

Figure 5:
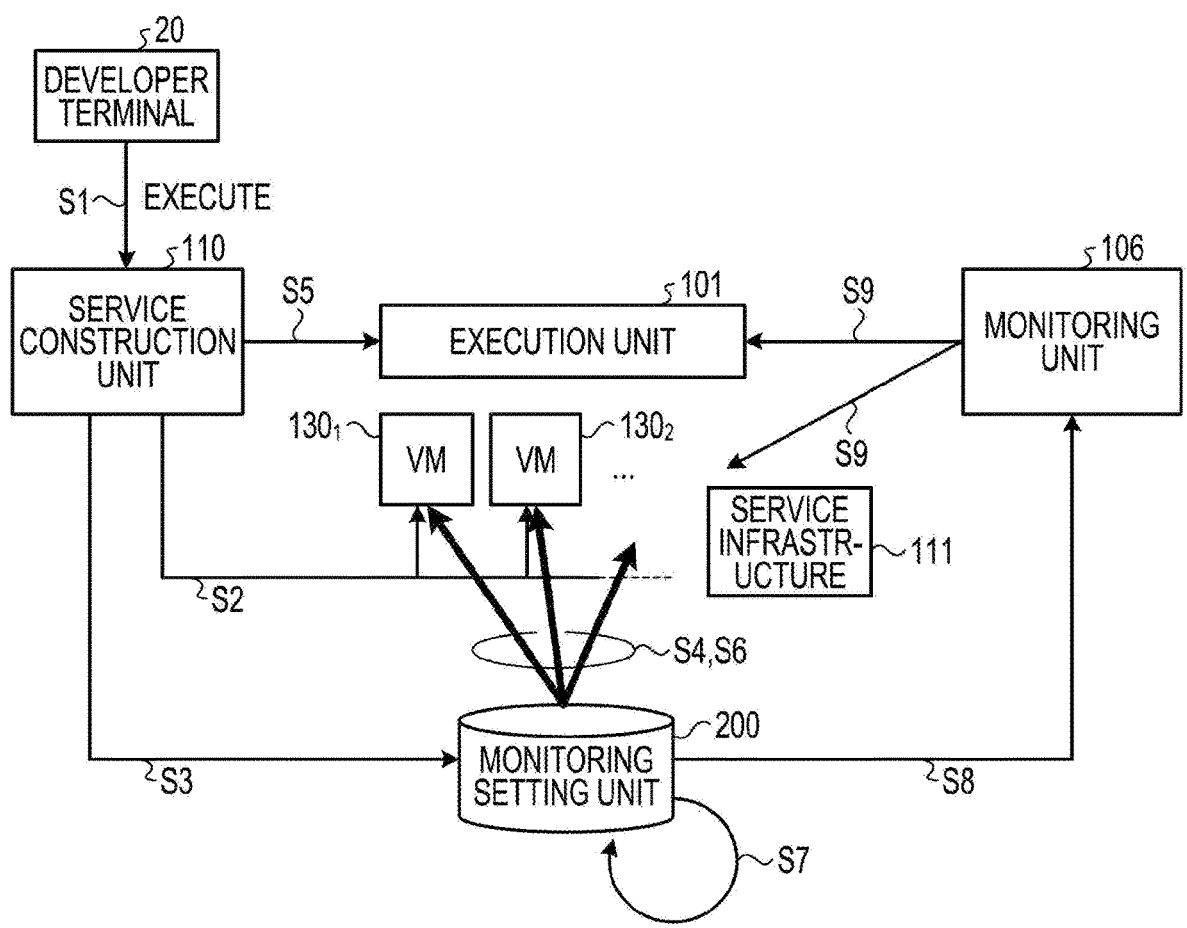
FIG. 5 is a view for explaining a flow of a process at the time of an initial construction according to Embodiment 1.

FIG. 5 is a view for explaining the flow of a process at the time of an initial construction according to Embodiment 1. In FIG. 5, the portions which are identical to those in FIGS. 1, 3, and 4 will be denoted with the same reference numerals as used in FIGS. 1, 3, and 4, and detailed description thereof will be omitted.

In FIG. 5, an execution of an initial construction is instructed from the developer terminal 20 to the service construction unit 110 (step S1). According to the instruction, the service construction unit 110 constructs the service infrastructure 111 and virtual machines $130_1$, $130_2$, . . . (step S2). The virtual machines $130_1$, $130_2$, . . . operate their respective predetermined operating systems (OS), and the application programs $120_1$, $120_2$, . . . operate on the OSs by using the function provided by the execution unit 101 (see FIG. 4).

In addition, FIG. 5 and FIGS. 10 and 11 to be described later illustrate the virtual machines $130_1$, $130_2$, . . . as VMs $130_1$, $130_2$, . . . , respectively.

After the virtual machines $130_1$, $130_2$, . . . are constructed, the service construction unit 110 causes the function of the monitoring setting unit 200 to be executed (step S3). The monitoring setting unit 200 includes the functions of the acquisition unit 102, the storage unit 103, the identifying unit 104, and the notification unit 105 illustrated in FIG. 3, sets an item to be monitored by the monitoring unit 106, and notifies the monitoring unit 106 of the set item.

In a subsequent step S4, the monitoring setting unit 200 acquires the behaviors of processes operating on the started virtual machines $130_1$, $130_2$, . . . , respectively. The monitoring setting unit 200 stores information indicating the acquired behaviors of the processes in association with the process identification information for identifying the processes in the storage unit 103. The behaviors of the processes include, for example, information on whether the process is operating, a port used by the process, a usage rate of a processor (e.g., the CPU 1000) or a memory (e.g., the RAM 1002) by the process, and etc.

Subsequently, the service construction unit 110 generates the execution unit 101 that provides the function to each of the virtual machines $130_1$, $130_2$, . . . (step S5).

After the execution unit 101 is generated by the service construction unit 110 in step S5, the monitoring setting unit 200 performs the same process as performed in step S4, again in step S6. That is, the monitoring setting unit 200 acquires the behaviors of the processes operating on the respective virtual machines $130_1$, $130_2$, . . . , and stores information indicating the acquired behaviors in association with process identification information for identifying the processes in the storage unit 103.

In a subsequent step S7, the monitoring setting unit 200 extracts a difference between the behaviors of the processes acquired in step S4 and the behaviors of the processes acquired in step S6, for each process identification information. The monitoring setting unit 200 identifies process identification information for which the extracted difference in the behaviors of the processes exceeds a predetermined criterion. The monitoring setting unit 200 generates a monitoring template for setting items to be monitored by the monitoring unit 106, based on the process identification information identified in step S7, and applies the generated monitoring template to the monitoring unit 106 (step S8).

According to the monitoring template applied in step S8, the monitoring unit 106 monitors the operations of the execution unit 101 and the respective virtual machines $130_1$, $130_2$, . . . (step S9).

Process Acquiring Process at the Time of Initial Construction According to Embodiment 1

Figure 6:
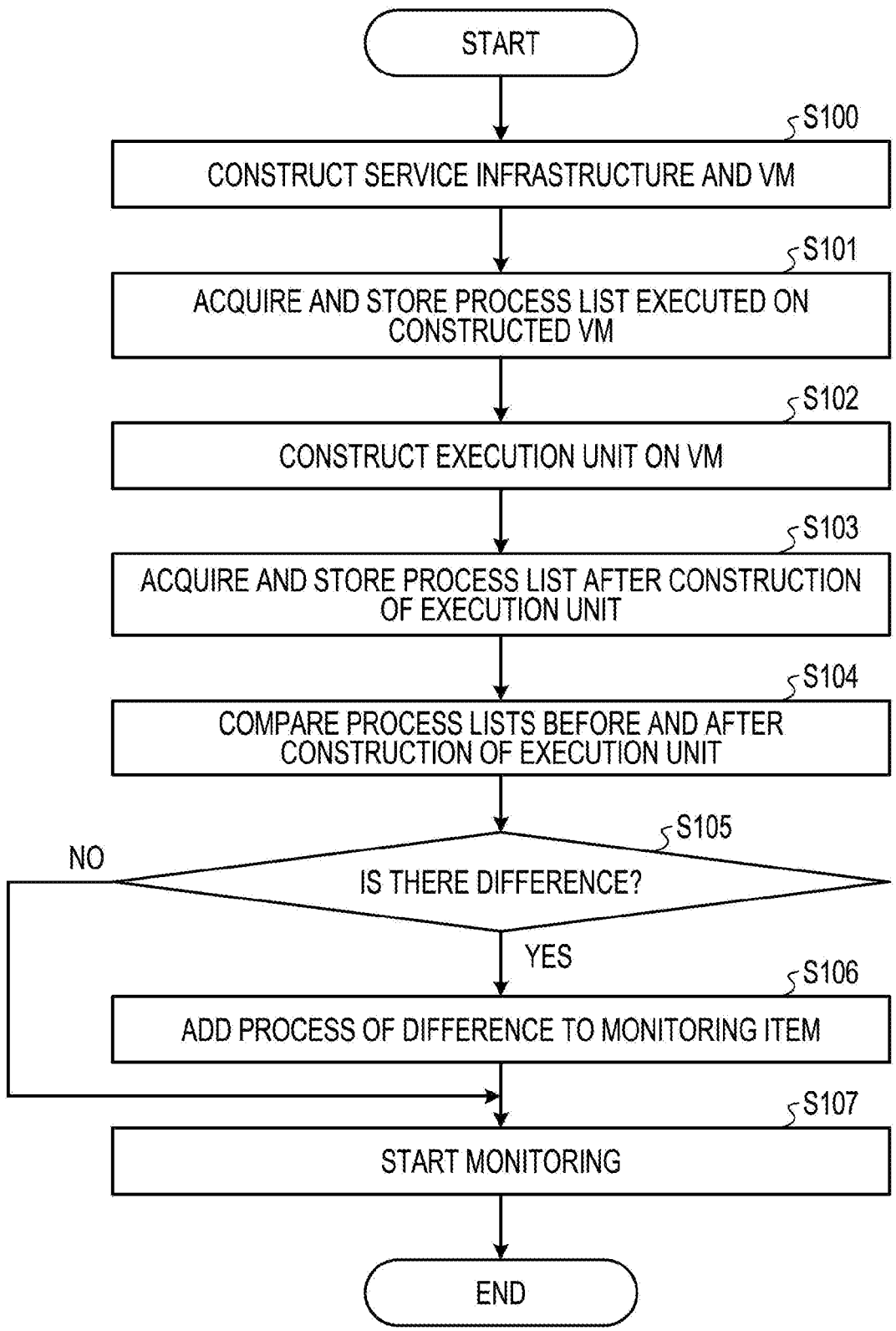
FIG. 6 is an example of a flowchart illustrating a process acquiring process at the time of the initial construction according to Embodiment 1.

FIG. 6 is an example of a flowchart illustrating a process acquiring process at the time of the initial construction according to Embodiment 1. In addition, in FIG. 6 and FIG. 8 to be described later, a virtual machine is described as "VM."

For example, when the execution of the initial construction is instructed from the developer terminal 20 to the service construction unit 110, the service construction unit 110 constructs the service infrastructure 111 and the virtual machines $130_1$, $130_2$, . . . in step S100 according to the instruction.

In a subsequent step S101, the service construction unit 110 causes the function of the monitoring setting unit 200 to be executed, so as to detect processes which are operating on the respective virtual machines $130_1$, $130_2$, . . . constructed in step S100. When the OS included in each of the virtual machines $130_1$, $130_2$, . . . is Linux (registered trademark), the processes being in operation may be detected by using a command "ps aux." The monitoring setting unit 200 acquires a list of detected processes, and stores the acquired process list in the storage unit 103.

In a subsequent step S102, the service construction unit 110 constructs the execution unit 101 on the respective virtual machines $130_1$, $130_2$, . . . .

In a subsequent step S103, the service construction unit 110 causes the function of the monitoring setting unit 200 to be executed, so as to detect the processes which are operating on the respective virtual machines $130_1$, $130_2$, . . . again. The monitoring setting unit 200 acquires a list of the detected processes, and stores the acquired process list in the storage unit 103.

In a subsequent step S104, the monitoring setting unit 200 compares the process lists before and after the construction of the execution unit 101. More specifically, the monitoring setting unit 200 compares the process list acquired in step S101 and the process list acquired in step S103 with each other.

In a subsequent step S105, the monitoring setting unit 200 determines whether there is a difference between the process list acquired and stored in step S101 and the process list acquired and stored in step S103, as a result of the comparison in step S104.

For example, in step S104, the monitoring setting unit 200 determines whether there is a process which is included in the process list acquired in step S103 and is not included in the process list acquired in step S101. In this case, when it is determined that there is a process which is included in the process list acquired in step S103 and is not included in the process list acquired in step S101, the corresponding process is identified as a process having the difference exceeding the predetermined criterion.

Without being limited thereto, the monitoring setting unit 200 may determine whether there is a process which is included in the process list acquired in step S101 and is not included in the process list acquired in step S103. In this case, when it is determined that there is a process which is included in the process list acquired in step S101 and is not included in the process list acquired in step S103, the corresponding process is identified as a process having the difference exceeding the predetermined criterion.

FIGS. 7A to 7C are views illustrating examples of the process lists acquired by the monitoring setting unit 200 according to Embodiment 1. FIG. 7A illustrates an example of the process list acquired in step S101. FIG. 7B illustrates an example of the process list acquired in step S103, and FIG. 7C illustrates an example of the process list acquired in step S103.

In FIGS. 7A, 7B, and 7C, each record included in the process list indicates information of each process, and includes items of "USER," "PID," "% CPU," "% MEM," "VSZ," "RSS," "TTY," "STAT," "START," "TIME," and "COMMAND."

The item "USER" indicates a user who executes a process. The item "PID" indicates process identification information for identifying a process. The item "% CPU" indicates a CPU usage rate of a process. The item "% MEM" indicates a proportion of a physical memory secured by a process (e.g., the storage area of the RAM 1002). The items "VSZ" and "RSS" indicate sizes of a virtual memory area and a physical memory area, respectively, which are used by a process. The item "TTY" indicates the name of an input/output terminal of a process. The item "STAT" indicates a state of a process. The item "START" indicates a time of starting to execute a process. The item "TIME" indicates a total execution time of a process. The item "COMMAND" indicates a command corresponding to a process.

The monitoring setting unit 200 compares, for example, the value of the item "PID" among the above-described items between the process list acquired in step S101 and the process list acquired in step S103. As an example, when the process list illustrated in FIG. 7B is acquired in step S103, the record in which the value of the item "PID" is "7" among the records included in the process list of FIG. 7B is not included in the process list of FIG. 7A. Accordingly, it may be identified that the process identified by the process identification information "7" is a process added by the construction of the execution unit 101.

As another example, when the process list illustrated in FIG. 7C is acquired in step S103, the record in which the value of the item "PID" is "5" among the records included in the process list of FIG. 7A is not included in the process list of FIG. 7C. Accordingly, it may be identified that the process identified by the process identification information "5" is a process deleted or stopped by the construction of the execution unit 101.

Referring back to the description of FIG. 6, when it is determined in step S105 that there is the difference ("Yes" in step S105), the monitoring setting unit 200 causes the process to proceed to step S106.

In step S106, the monitoring setting unit 200 adds the process detected as the difference, as a monitoring item to the monitoring template. In the example of FIG. 7B described above, the process identified by the process identification information "7" is added to the monitoring item of the monitoring template. In addition, in the example of FIG. 7C described above, the process identified by the process identification information "5" is added to the monitoring item of the monitoring template. When the process detected as the difference is added to the monitoring item, the process proceeds to step S107.

When it is determined in step S105 that there is no difference ("No" in step S105), the monitoring setting unit 200 causes the process to proceed to step S107. In this case, the monitoring template is, for example, in the initial state.

In step S107, the monitoring setting unit 200 applies the monitoring template to the monitoring unit 106. The monitoring unit 106 starts the monitoring of the execution unit 101 and the respective virtual machines $130_1$, $130_2$, . . . according to the applied monitoring template.

In addition, in the description above, the monitoring setting unit 200 compares the values of the item "PID" before and after the construction of the execution unit 101, among the items included in the process list. Without being limited thereto, the monitoring setting unit 200 may compare values of other items. For example, it may be conceived that the monitoring setting unit 200 compares the values of the item "% CPU" or "% MEM" before and after the construction of the execution unit 101, among the items included in the process list.

For example, for the item "% CPU," the monitoring setting unit 200 obtains a difference in the value of the item "% CPU" between the processes having the same value of the item "PID" in the process list acquired in step S101 and the process list acquired in step S103. The monitoring setting unit 200 detects a process in which the obtained difference exceeds a predetermined value, and identifies the value of the item "PID" of the detected process, that is, the process identification information. The monitoring setting unit 200 sets the process indicated by the identified process identification information, as a monitoring target process in the monitoring template. This identically applies to the comparison of the item "% MEM."

Port Acquiring Process at the Time of Initial Construction According to Embodiment 1

Figure 8:
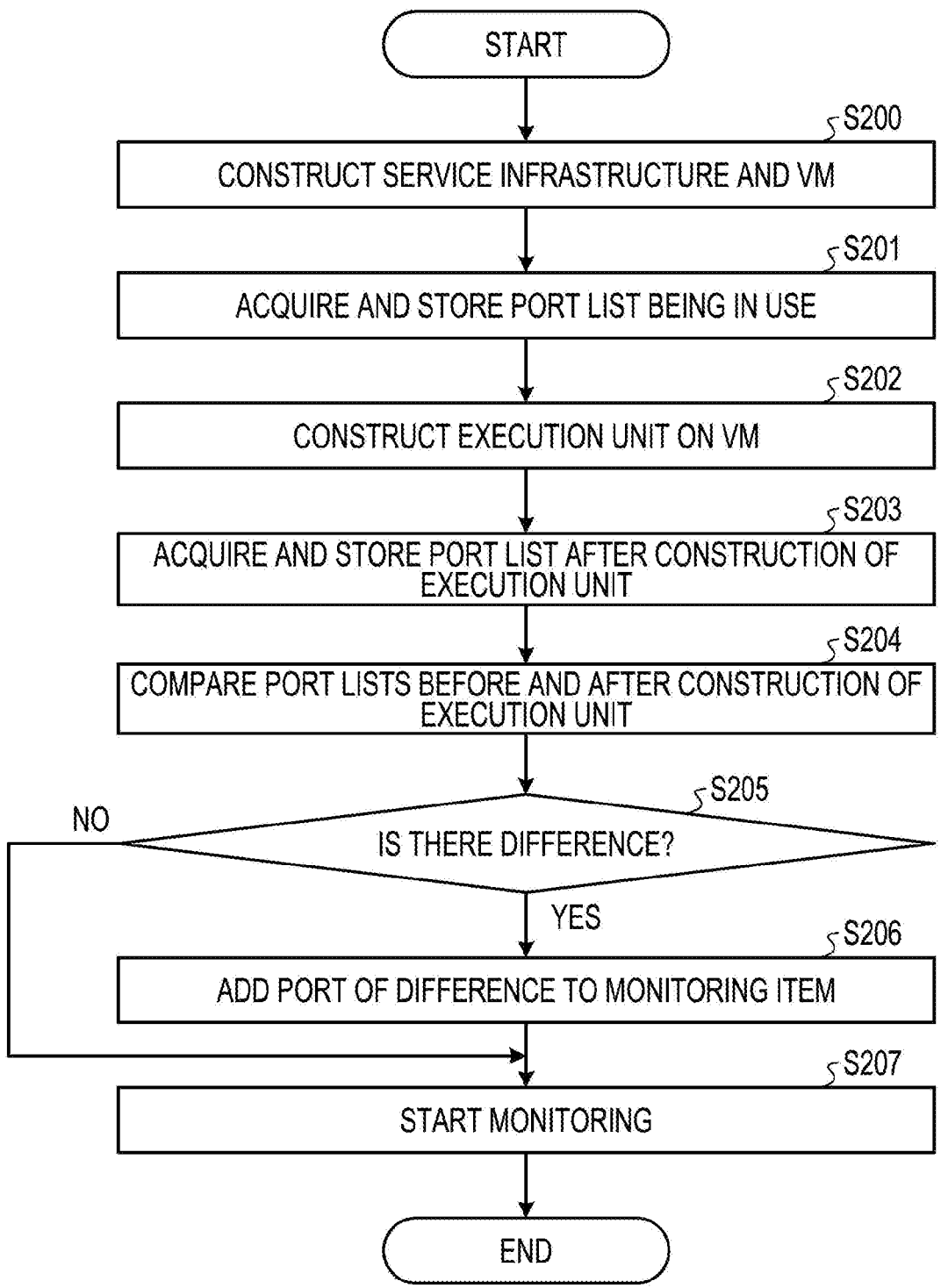
FIG. 8 is an example of a flowchart illustrating a port acquiring process at the time of the initial construction according to Embodiment 1.

Subsequently, a port acquiring process at the time of the initial construction according to Embodiment 1 will be described. FIG. 8 is an example of a flowchart illustrating a port acquiring process at the time of the initial construction according to Embodiment 1. For example, when the execution of the initial construction is instructed from the developer terminal 20 to the service construction unit 110, the service construction unit 110 constructs the service infrastructure 111 and the virtual machines $130_1$, $130_2$, . . . in step S200 according to the instruction.

In a subsequent step S201, the service construction unit 110 causes the function of the monitoring setting unit 200 to be executed, so as to detect ports which are used by the respective virtual machines $130_1$, $130_2$, . . . constructed in step S200. When the OS included in each of the virtual machines $130_1$, $130_2$, . . . is Linux (registered trademark), the ports being in use may be detected by using, for example, a command "netstat-t" for detecting a port of which a connection has been established. The monitoring setting unit 200 acquires a list of the detected ports, and stores the acquired port list in the storage unit 103.

In a subsequent step S202, the service construction unit 110 constructs the execution unit 101 on the respective virtual machines $130_1$, $130_2$, . . . .

In a subsequent step S203, the service construction unit 110 causes the function of the monitoring setting unit 200 to be executed, so as to detect the ports which are used by the respective virtual machines $130_1$, $130_2$, . . . , again. When the OS included in each of the virtual machines $130_1$, $130_2$, . . . is Linux (registered trademark), the detection of the ports in step S203 may be performed by using, for example, a command "netstat-antu" for detecting a port which is being started. The monitoring setting unit 200 acquires a list of the detected ports, and stores the acquired port list in the storage unit 103.

In a subsequent step S204, the monitoring setting unit 200 compares the port lists before and after the construction of the execution unit 101. More specifically, the monitoring setting unit 200 compares the port list acquired in step S201 and the port list acquired in step S203 with each other.

In a subsequent step S205, the monitoring setting unit 200 determines whether there is a difference between the port list acquired and stored in step S201 and the port list acquired and stored in step S203, as a result of the comparison in step S204.

For example, in step S204, the monitoring setting unit 200 determines whether there is a port which is included in the port list acquired in step S203 and is not included in the port list acquired in step S201. In this case, when it is determined that there is a port which is included in the port list acquired in step S203 and is not included in the port list acquired in step S201, the corresponding port is identified as a port having a difference exceeding a predetermined criterion.

Without being limited thereto, the monitoring setting unit 200 may determine whether there is a port which is included in the port list acquired in step S201 and is not included in the port list acquired in step S203. In this case, when it is determined that there is a port which is included in the port list acquired in step S201 and is not included in the port list acquired in step S203, the corresponding port is identified as a port having a difference exceeding the predetermined criterion.

FIGS. 9A and 9B are views illustrating examples of the port lists acquired by the monitoring setting unit 200 according to Embodiment 1. FIG. 9A illustrates an example of the port list acquired in step S201. In addition, FIG. 9B illustrates an example of the port list acquired in step S203.

In FIGS. 9A and 9B, each record included in the port list indicates information of a port and includes items of "Proto," "Recv-Q," "Send-Q," "Local Address," "Foreign Address," and "State."

The item "Proto" indicates the protocol used in a port. The items "Recv-Q" and "Send-Q" indicate amounts of data that could not have been received and transmitted, respectively. The items "Local Address" and "Foreign Address" indicate an address and a port number (or port name) of a local side and a remote side, respectively. The port number (or port name) is present next to the colon (":"). The item "State" indicates a state of a port.

The monitoring setting unit 200 compares, for example, a combination of the port numbers or a combination of the port number and the port name in the items "Local Address" and "Foreign Address," among the above-described items, between the port list acquired in step S201 and the port list acquired in step S203. As an example, when the port list illustrated in FIG. 9B is acquired in step S203, the record including the combination of the port numbers "10050" and "10051" among the records included in the port list of FIG. 9B is not included in the process list of FIG. 9A. Accordingly, it may be identified that the ports identified by the port numbers "10050" and "10051," respectively, are ports added by the construction of the execution unit 101.

Referring back to the description of FIG. 8, when it is determined in step S205 that there is the difference ("Yes" in step S205), the monitoring setting unit 200 causes the process to proceed to step S206.

In step S206, the monitoring setting unit 200 adds the ports detected as the difference, as monitoring items to the monitoring template. In the example of FIG. 9B described above, the ports identified by the port numbers "10050" and "10051," respectively, are added to the monitoring items of the monitoring template. When the ports defected as the difference are added to the monitoring items, the process proceeds to step S207.

When it is determined in step S205 that there is no difference ("No" in step S205), the monitoring setting unit 200 causes the process to proceed to step S207. In this case, the monitoring template is, for example, in the initial state.

In step S207, the monitoring setting unit 200 applies the monitoring template to the monitoring unit 106. The monitoring unit 106 starts the monitoring of the execution unit 101 and the respective virtual machines $130_1$, $130_2$, . . . according to the applied monitoring template.

In Embodiment 1, as described above, the behaviors of the processes operating in the respective virtual machines $130_1$, $130_2$, . . . are compared before and after the construction of the execution unit 101, a process of which the change of the behavior is larger than or equal to a predetermined criterion is identified, and the identified process is set as a monitoring target. Thus, the items to be monitored by the monitoring unit 106 may be set easily.

Further, since the presence/absence of a port being in use or the usage rates of a processor and a memory may be compared before and after the construction of the execution unit 101, the items to be monitored by the monitoring unit 106 may be set easily in relatively more aspects.

Embodiment 2

Subsequently, Embodiment 2 will be described. Embodiment 2 is an example of a process at the time of using a service after the initial construction according to Embodiment 1 is completed as described above. FIG. 10 is a view for explaining the flow of a process at the time of using a service according to Embodiment 2. In FIG. 10, the same portions which are identical to those in FIGS. 1, 3, and 4 will be denoted with the same reference numerals as used in FIGS. 1, 3, and 4, and detailed descriptions thereof will be omitted.

Figure 10:
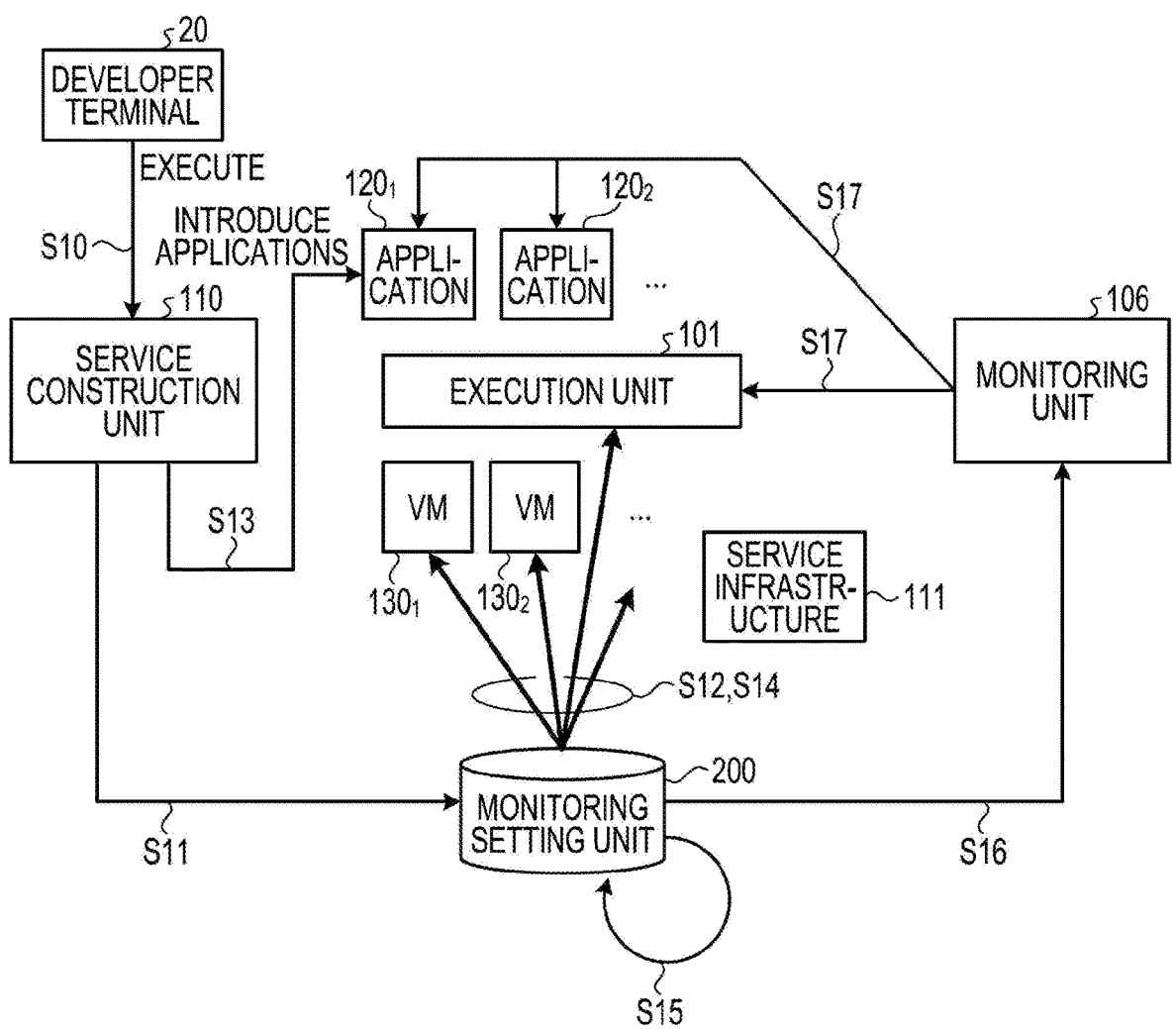
FIG. 10 is a view for explaining a flow of a process at the time of using a service according to Embodiment 2.

In FIG. 10, for example, the execution of the service construction is instructed from the developer terminal 20 to the service construction unit 110 (step S10). According to the instruction, the service construction unit 110 causes the function of the monitoring setting unit 200 to be executed (step S11).

In subsequent step S12, the monitoring setting unit 200 acquires the behaviors of the processes operating on the respective virtual machines $130_1$, $130_2$, . . . and the behavior of the process operating on the execution unit 101. The monitoring setting unit 200 stores information indicating the acquired behaviors of the processes in association with process identification information for identifying the processes in the storage unit 103.

Subsequently, the service construction unit 110 introduces the application programs $120_1$, $120_2$, . . . to the information processing apparatus 10 (step S13). The application programs $120_1$, $120_2$, . . . are executed using the function provided by the execution unit 101 according to requests from the respective virtual machines $130_1$, $130_2$, . . . . The application programs $120_1$, $120_2$, . . . to be introduced are designated in, for example, step S10 when the execution of the service construction is instructed from the developer terminal 20. The application programs $120_1$, $120_2$, . . . to be introduced by the service construction unit 110 may be preset.

In addition, FIG. 10 and FIG. 11 to be described later illustrate the application programs $120_1$, $120_2$, . . . as applications $120_1$, $120_2$, . . . .

After the application programs $120_1$, $120_2$, . . . are introduced by the service construction unit 110 in step S13, the monitoring setting unit 200 executes the same process as executed in step S12, again in step S14. That is, the monitoring setting unit 200 acquires the behaviors of the processes operating on the respective virtual machines $130_1$, $130_2$, . . . and the behavior of the process operating on the execution unit 101, and stores information indicating the acquired behaviors in association with process identification information for identifying the processes, in the storage unit 103.

In a subsequent step S15, the monitoring setting unit 200 extracts a difference between the behaviors of the processes acquired in step S12 and the behaviors of the processes acquired in step S14 for each pieces of the process identification information. The monitoring setting unit 200 identifies the process identification information in which the extracted difference in the behavior of the process exceeds a predetermined criterion. The monitoring setting unit 200 generates a monitoring template for setting items to be monitored by the monitoring unit 106, based on the process identification information identified in step S15, and applies the generated monitoring template to the monitoring unit 106 (step S16).

According to the monitoring template applied in step S16, the monitoring unit 106 monitors the operations of the respective application programs $120_1$, $120_2$, . . . and the execution unit 101 (step S17).

The process acquiring process at the time of using a service according to Embodiment 2 will be described with reference to the flowchart of FIG. 6 described above. For example, when the execution of the service construction is instructed from the developer terminal 20 to the service construction unit 110, the service construction unit 110 causes the function of the monitoring setting unit 200 to be executed, so as to detect the processes operating on the respective virtual machines $130_1$, $130_2$, . . . and the execution unit 101 that have already been constructed (see step S101 of FIG. 6). The monitoring setting unit 200 acquires a list of the detected processes, and stores the acquired process list in the storage unit 103.

Subsequently, the service construction unit 110 introduces the application programs $120_1$, $120_2$, . . . on the execution unit 101 (see step S102 of FIG. 6). Subsequently, the service construction unit 110 causes the function of the monitoring setting unit 200 to be executed, so as to detect the processes operating on the respective virtual machines $130_1$, $130_2$, . . . and the execution units 101 again (see step S103 of FIG. 6). The monitoring setting unit 200 acquires a list of the detected processes, and stores the acquired process list in the storage unit 103.

Subsequently, the monitoring setting unit 200 compares the process lists before and after the introduction of the application programs $120_1$, $120_2$, . . . (see step S104 of FIG. 6).

Subsequently, the monitoring setting unit 200 determines whether there is a difference in the process list acquired before the introduction of the application programs $120_1$, $120_2$, . . . and the process list acquired after the introduction of the application programs $120_1$, $120_2$, . . . , as a result of the comparison of the process lists before and after the introduction of the application programs $120_1$, $120_2$, . . . (see step S105 of FIG. 6).

For example, the monitoring setting unit 200 determines whether there is a process which is included in the process list acquired after the introduction of the application programs $120_1$, $120_2$, . . . and is not included in the process list acquired before the introduction of the application programs $120_1$, $120_2$, . . . . In addition, the monitoring setting unit 200 may determine whether there is a process which is included in the process list acquired before the introduction of the application programs $120_1$, $120_2$, . . . and is not included in the process list acquired after the introduction of the application programs $120_1$, $120_2$, . . . .

In this comparison as well, the monitoring setting unit 200 uses, for example, the value of the item "PID" among the items of each record included in the process list, as a comparison target. Without being limited thereto, the monitoring setting unit 200 may use the value of the item "% CPU" or "% MEM" among the items included in the process list as a comparison target, as in Embodiment 1.

When it is determined that there is a difference in the process lists acquired before and after the introduction of the application programs $120_1$, $120_2$, . . . , the monitoring setting unit 200 adds the process detected as the difference, as a monitoring item to the monitoring template (see step S106 of FIG. 6). The monitoring setting unit 200 applies the monitoring template to the monitoring unit 106 (see step S107 of FIG. 6). The monitoring unit 106 starts the monitoring of the respective application programs $120_1$, $120_2$, . . . according to the applied monitoring template.

Port Acquiring Process at the Time of Using a Service According to Embodiment 2

Subsequently, a port acquiring process at the time of using a service according to Embodiment 2 will be described. For example, when the execution of the service construction is instructed from the developer terminal 20 to the service construction unit 110, the service construction unit 110 causes the function of the monitoring setting unit 200 to be executed, so as to detect ports which are used by the respective virtual machines $130_1$, $130_2$, . . . and the execution units 101 that have already been constructed (see step S201 of FIG. 8). The monitoring setting unit 200 acquires a list of the detected ports, and stores the acquired port list in the storage unit 103.

Subsequently, the service construction unit 110 introduces the respective application programs $120_1$, $120_2$, . . . on the execution units 101 (see step S202 of FIG. 8). Subsequently, the service construction unit 110 causes the function of the monitoring setting unit 200 to be executed, so as to detect the ports which are used by the respective virtual machines $130_1$, $130_2$, . . . and the execution units 101 again (see step S203 of FIG. 8). The monitoring setting unit 200 acquires the list of the detected ports and stores the acquired port list in the storage unit 103.

Subsequently, the monitoring setting unit 200 compares the port lists before and after the introduction of the respective application programs $120_1$, $120_2$, . . . (see step S204 of FIG. 8).

Subsequently, the monitoring setting unit 200 determines whether there is a difference in the port list acquired before the introduction of the application programs $120_1$, $120_2$, . . . and the port list acquired after the introduction of the application programs $120_1$, $120_2$, . . . , as a result of the comparison of the port lists before and after the introduction of the application programs $120_1$, $120_2$, . . . (see step S205 of FIG. 8).

For example, the monitoring setting unit 200 determines whether there is a port which is included in the port list acquired after the introduction of the application programs $120_1$, $120_2$, . . . and is not included in the port list acquired before the introduction of the application programs $120_1$, $120_2$, . . . . In addition, the monitoring setting unit 200 may determine whether there is a port which is included in the port list acquired before the introduction of the application programs $120_1$, $120_2$, . . . and is not included in the port list acquired after the introduction of the application programs $120_1$, $120_2$, . . . .

In this comparison as well, the monitoring setting unit 200 may use the combination of the port number and the port name in the items "Local Address" and "Foreign Address" as a comparison target.

When it is determined that there is a difference in the port lists acquired before and after the introduction of the application programs $120_1$, $120_2$, . . . , the monitoring setting unit 200 adds the port detected as the difference, as a monitoring item to the monitoring template (see step S206 of FIG. 8). The monitoring setting unit 200 applies the monitoring template to the monitoring unit 106 (see step S207 of FIG. 8). The monitoring unit 106 starts the monitoring of the respective application programs $120_1$, $120_2$, . . . according to the applied monitoring template.

In Embodiment 2, as described above, the behaviors of the processes operating on the virtual machines $130_1$, $130_2$, . . . and the execution units 101 are compared before and after the introduction of the application programs $120_1$, $120_2$, . . . , a process of which the change of the behavior is larger than or equal to a predetermined criterion is identified, and the identified process is set as a monitoring target. Thus, the items to be monitored by the monitoring unit 106 may easily be set.

Modification of Embodiment 2

Subsequently, a modification of Embodiment 2 will be described. The modification of Embodiment 2 is an example where the respective application programs $120_1$, $120_2$, . . . for providing a service are introduced using the execution unit 101 without using the service construction unit 110

Figure 11:
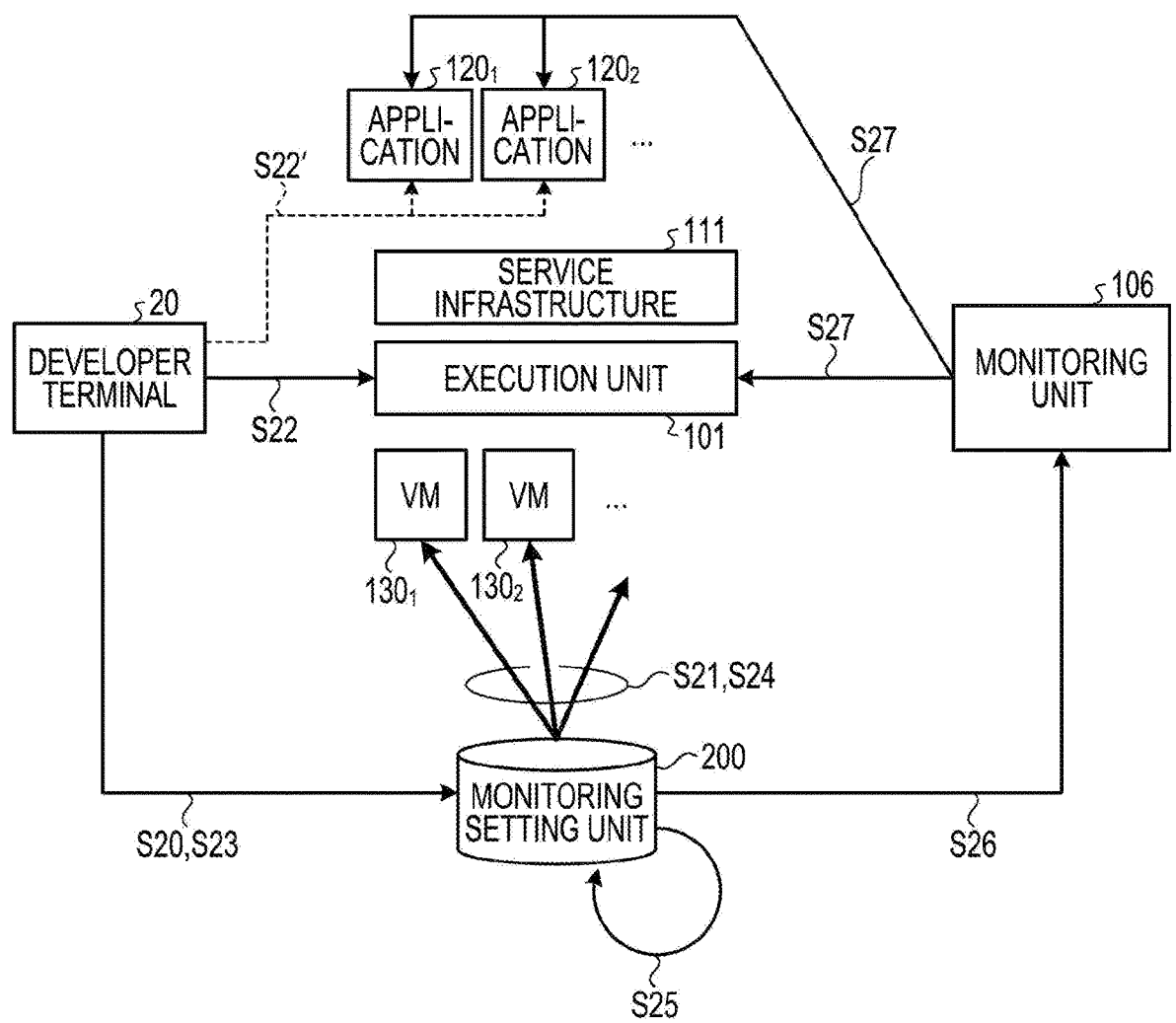
FIG. 11 is a view for explaining a flow of a process at the time of using a service according to a modification of Embodiment 2.

FIG. 11 is a view illustrating the flow of a process at the time of using a service according to a modification of Embodiment 2. In addition, in FIG. 11, the portions which are identical to those in FIG. 10 will be denoted with the same reference numerals as used in FIG. 10, and detailed description thereof will be omitted.

In FIG. 11, for example, the execution of the function of the monitoring setting unit 200 is instructed from the developer terminal 20 to the monitoring setting unit 200 (step S20). The monitoring setting unit 200 acquires the behaviors of the processes operating on the respective virtual machines $130_1$, $130_2$, . . . and the behavior of the process operating on the execution unit 101. The monitoring setting unit 200 stores information indicating the acquired behaviors of processes in association with process identification information for identifying the processes in the storage unit 103.

Subsequently, for example, the introduction of the application programs $120_1$, $120_2$, . . . is instructed from the developer terminal 20 to the execution unit 101 (step S22). For example, the introduction of the application programs $120_1$, $120_2$, . . . may be executed by applying a command from the developer terminal 20 directly to the execution unit 101. According to the instruction, the application programs $120_1$, $120_2$, . . . are introduced to the information processing apparatus 10 (step S22').

Without being limited thereto, the application programs $120_1$, $120_2$, . . . may be developed by the developer terminal 20 using the function of the execution unit 101 and introduced to the information processing apparatus 10.

After the application programs $120_1$, $120_2$, . . . are introduced in step S22', the monitoring setting unit 200 executes the same process as executed in step S21, again in step S24. That is, the monitoring setting unit 200 acquires the behaviors of the processes operating on the respective virtual machines $130_1$, $130_2$, . . . and the execution unit 101, and stores information indicating the acquired behaviors in association with process identification information for identifying the processes in the storage unit 103.

In subsequent step S25, the monitoring setting unit 200 executes a difference between the behaviors of the processes acquired in step S21 and the behaviors of the processes acquired in step S24, for each piece of the process identification information. The monitoring setting unit 200 identifies process identification information in which the extracted difference in the behavior of the process exceeds a predetermined criterion. The monitoring setting unit 200 generates a monitoring template for setting items to be monitored by the monitoring unit 103 based on the process identification information identified in step S25, and applies the generated monitoring template to the monitoring unit 106 (step S26).

The monitoring unit 106 monitors the operations of the respective application programs $120_1$, $120_2$, . . . and the execution unit 101 according to the monitoring template applied in step S26 (step S27).

In a case where the application programs $120_1$, $120_2$, . . . are introduced without using the service construction unit 110 as described above as well, the behaviors of the processes operating on the virtual machines $130_1$, $130_2$, . . . and the execution unit 110 may be compared before and after the introduction of the application programs $120_1$, $120_2$, . . . , as in Embodiment 2. Thus, the items to be monitored by the monitoring unit 106 may be set easily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a notification control process, the notification control process comprising:

acquiring identification information of a process executed on a virtual machine and information indicating a behavior of the process at a time when the process is executed, and sequentially storing the information in a memory;

referring to the information stored in the memory when a deployment of software in the virtual machine is detected, identify first identification information of a first process such that a change of the behavior at the time when the first process is executed before and after the deployment exceeds a predetermined first criterion; and notifying the first identification information to a monitoring process that monitors an operation of the software.

2. The non-transitory computer-readable recording medium according to claim 1, wherein the behavior of the first process at the time when the first process is executed is a use status of hardware used by the first process or a port used by the execution of the first process.

3. The non-transitory computer-readable recording medium according to claim 1, the notification control process further comprising:

identifying, when a deployment of middleware in the virtual machine is detected, identification information of a second process such that a change of the behavior at the time when the second process is executed before and after the deployment of the middleware exceeds a predetermined second criterion.

4. T The non-transitory computer-readable recording medium according to claim 1, the notification control process further comprising:

identifying, when a deployment of an application program in the virtual machine is detected after a deployment of middleware in the virtual machine is detected, identification information of a second process in which a change of the behavior at the time when the second process is executed before and after the deployment of the application program exceeds a predetermined second criterion.

5. A notification control method, comprising:

acquiring, by a computer, identification information of a process executed on a virtual machine and information indicating a behavior of the process at a time when the process is executed, and sequentially storing the information in a memory;

referring to the information stored in the memory when a deployment of software in the virtual machine is detected, identify first identification information of a first process such that a change of the behavior at the time when the first process is executed before and after the deployment exceeds a predetermined first criterion; and notifying the first identification information to a monitoring process that monitors an operation of the software.

6. The notification control method according to claim 5, wherein the behavior of the first process at the time when the first process is executed is a use status of hardware used by the first process or a port used by the execution of the first process.

7. The notification control method according to claim 5, further comprising:

identifying, when a deployment of middleware in the virtual machine is detected, identification information of a second process such that a change of the behavior at the time when the second process is executed before and after the deployment of the middleware exceeds a predetermined second criterion.

8. The notification control method according to claim 5, further comprising:

identifying, when a deployment of an application program in the virtual machine is detected after a deployment of middleware in the virtual machine is detected, identification information of a second process in which a change of the behavior at the time when the second process is executed before and after the deployment of the application program exceeds a predetermined second criterion.

9. An information processing apparatus, comprising:

a memory; and a processor coupled to the memory and the processor configured to:

acquire identification information of a process executed on a virtual machine and information indicating a behavior of the process at a time when the process is executed, and sequentially store the information in the memory;

refer to the information stored in the memory when a deployment of software in the virtual machine is detected, identify first identification information of a first process such that a change of the behavior at the time when the first process is executed before and after the deployment exceeds a predetermined first criterion; and notify the first identification information to a monitoring process that monitors an operation of the software.

10. The information processing apparatus according to claim 9, wherein the behavior of the first process at the time when the first process is executed is a use status of hardware used by the first process or a port used by the execution of the first process.

11. The information processing apparatus according to claim 9, wherein the processor is further configured to:

identify, when a deployment of middleware in the virtual machine is detected, identification information of a second process such that a change of the behavior at the time when the second process is executed before and after the deployment of the middleware exceeds a predetermined second criterion.

12. The information processing apparatus according to claim 9, wherein the processor is further configured to:

identify, when a deployment of an application program in the virtual machine is detected after a deployment of middleware in the virtual machine is detected, identification information of a second process in which a change of the behavior at the time when the second process is executed before and after the deployment of the application program exceeds a predetermined second criterion.

* * * * *